United States Patent [19]

Sudo et al.

[11] 4,183,674

[45] Jan. 15, 1980

[54] MELT MIXER

[75] Inventors: Sadayuki Sudo; Takenaga Sudo, both of Tokyo, Japan

[73] Assignee: Nara Grinding Machinery Works, Ltd., Tokyo, Japan

[21] Appl. No.: 856,907

[22] Filed: Dec. 2, 1977

[30] Foreign Application Priority Data

Jul. 8, 1977 [JP] Japan .................................. 52-90527

[51] Int. Cl.² .......................... A21C 1/06; B28C 1/16; B29B 1/06; B01F 7/02
[52] U.S. Cl. ...................................... 366/91; 366/97; 366/147; 366/149; 366/300
[58] Field of Search ................. 366/147, 97, 300, 149, 366/144, 98, 297, 298, 299, 300, 301, 83, 91

[56] References Cited

U.S. PATENT DOCUMENTS

| 2,027,185 | 1/1936 | Loomis | 366/147 |
| 2,584,225 | 2/1952 | Plunguian | 366/300 |
| 2,753,159 | 7/1956 | Christian | 366/147 |
| 3,230,581 | 1/1966 | Tyson | 366/97 |
| 3,576,675 | 4/1971 | Abramson | 366/300 |
| 4,025,058 | 5/1977 | Mizuguchi | 366/149 |

Primary Examiner—Robert W. Jenkins

[57] ABSTRACT

A melt mixer comprises a vessel equipped with heating means, and a pair or more of rotor means including rotors polygonal in cross section and held within the vessel, the rotor means having a heating function. The rotors of each rotor means are angularly staggered to the rotors of the adjacent rotor means. Each rotor means comprises a plurality of rotors axially mounted on a rotating shaft, the rotors being angularly staggered and spaced in succession from one another. Also, the rotor means are so disposed as to be axially movable together with one jacketed side plate of the vessel.

20 Claims, 5 Drawing Figures

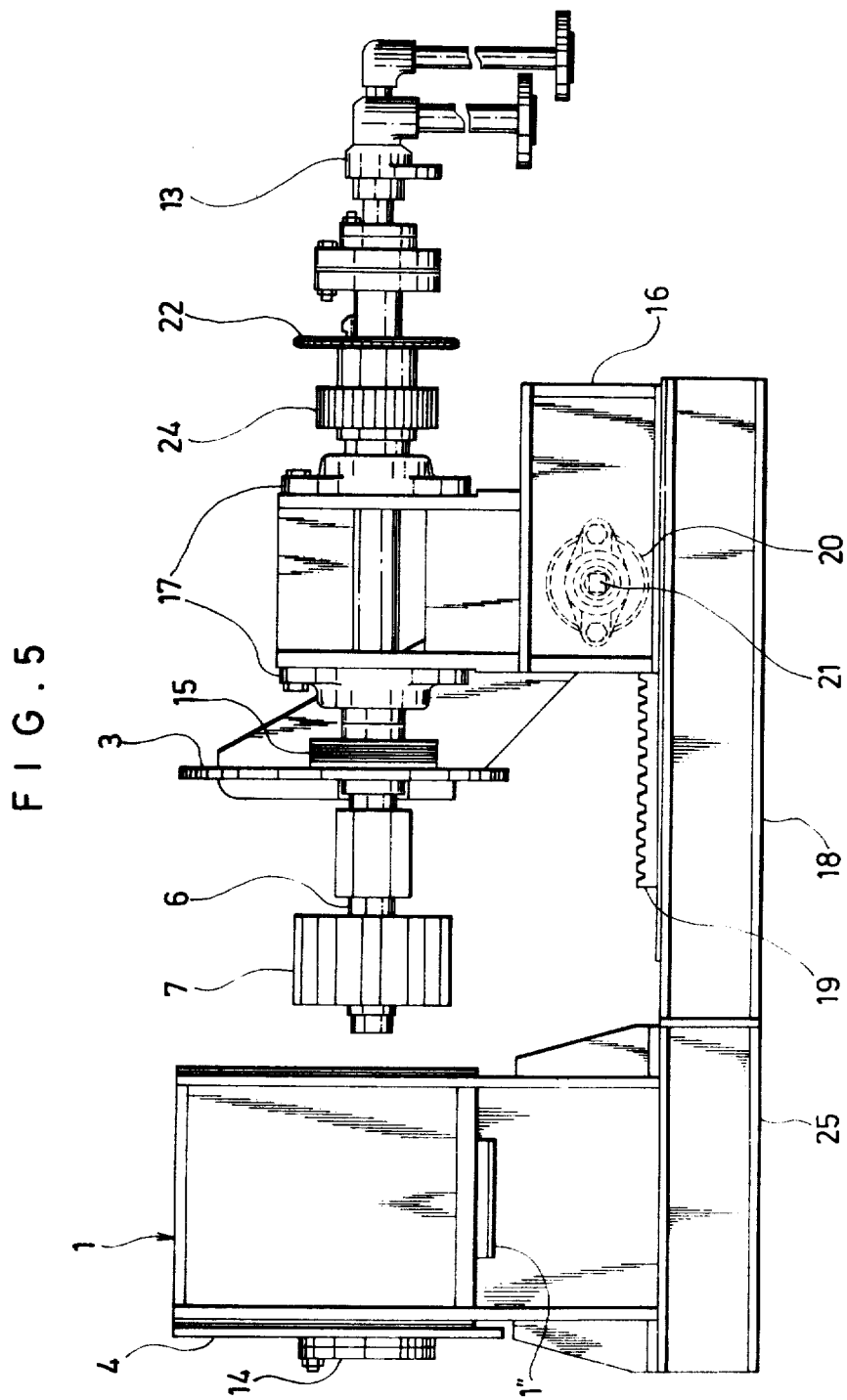

MELT MIXER

This invention relates to a melt mixer having rotor means with heating ability for improved melting efficiency and interior cleanability.

Conventional equipment for melting waxes, rosin, synthetic resins, and other meltable materials use rotary agitators, such as of ribbon, screw, Sigma-blade, and fishtail types, which are not cored or otherwise machined to permit circulation of a heating medium through the agitator body. When such rotary agitators are employed, for example, in melting ethylene vinylacetate copolymer (EVA) which attains a high viscosity of the order of 300,000 centipoises upon melting, they usually require very long periods of time to achieve the end. They simply stir and disturb the solid material before melting and are not powerful enough to force the material effectively against the heating surface.

It is often the case with this type of melting operations, where materials for a great variety of applications are handled, that the material being melted has to be replaced by another material of a different kind or color. Especially where the operation is to be switched over to the melting of a differently colored material, the inside of the apparatus must be cleaned as completely as possible in advance. Thus, for each color change, the ordinary apparatus has to be broken up into pieces for thorough cleaning.

The present invention has for its object to eliminate the foregoing and other disadvantages of the existing equipment and provide a melt mixer which has rotors of an improved shape, with circulation of a heating medium through the rotor means for an increased heating surface area, so that even when a highly viscous material is worked the melting time is remarkably shortened by the compressive forces imposed by the special rotors, the rotor means being detachable with a minimum of disassembling to provide ready access to the inside for cleaning.

Specifically, the mixer of the invention is characterized by a pair or more of rotor means consisting of rotors of a polygonal cross section disposed in a vessel equipped with heater means, the rotor means themselves having their own heating function.

The above and other objects and advantages of this invention will become more apparent from the following description when taken in conjunction with the accompanying drawings, in which.

Figure 1:
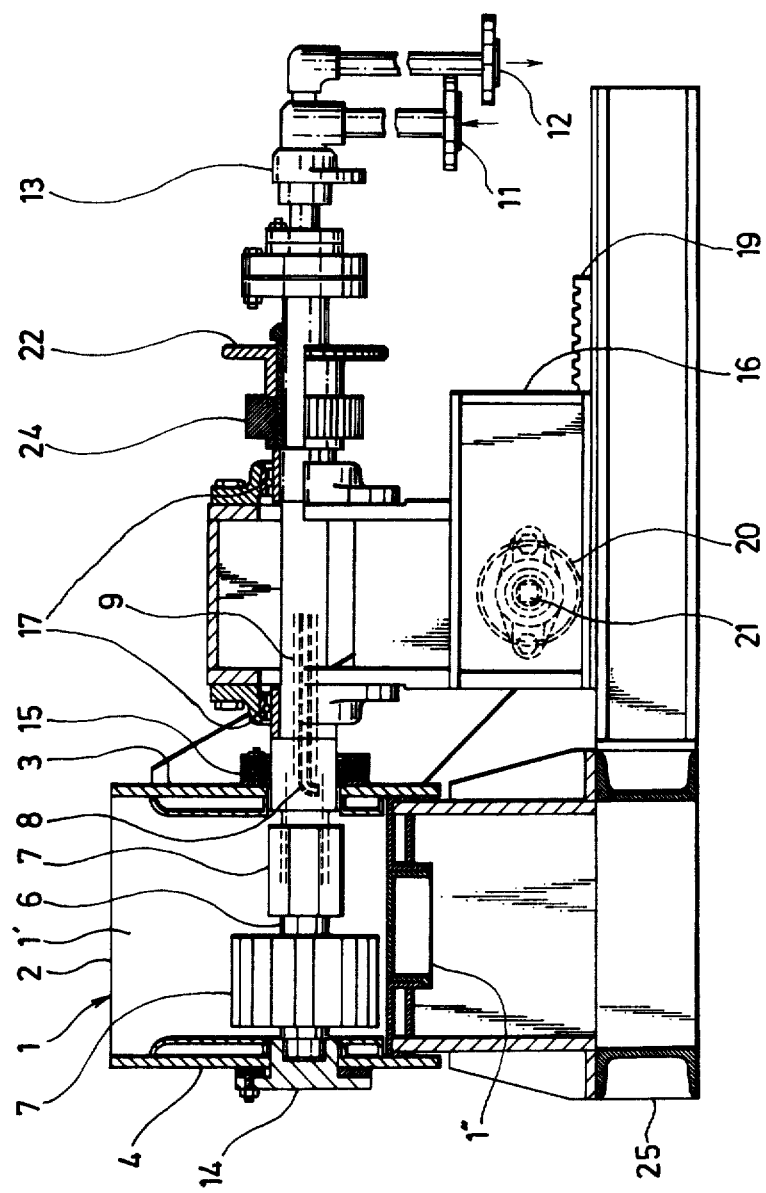
FIG. 1 is a partly sectional front view of a melt mixer embodying the invention.

FIGS. 4(a) through (i) are sequential views schematically illustrating the interrelated compressive actions of the rotor means; and FIG. 5 is a view similar to FIG. 1 but showing the rotor means as separated from the vessel.

Figure 2:
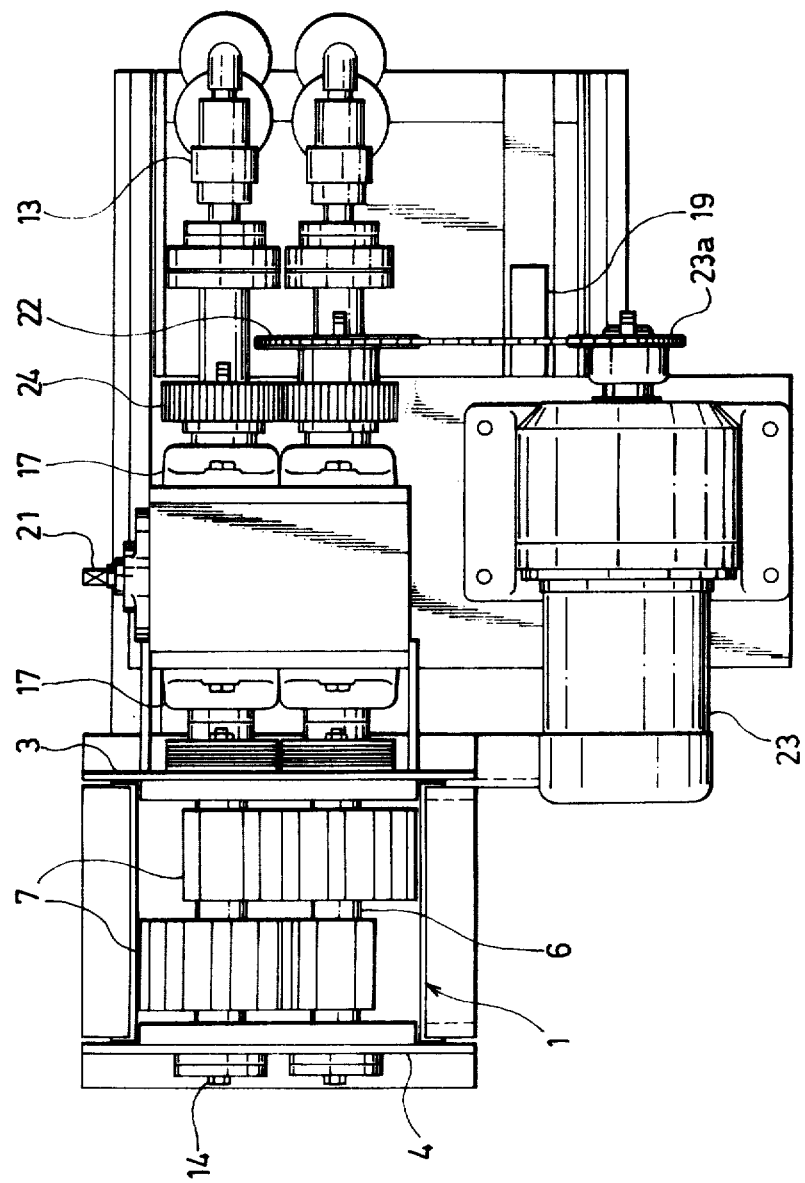
FIG. 2 is a top view of the mixer.
Figure 3:
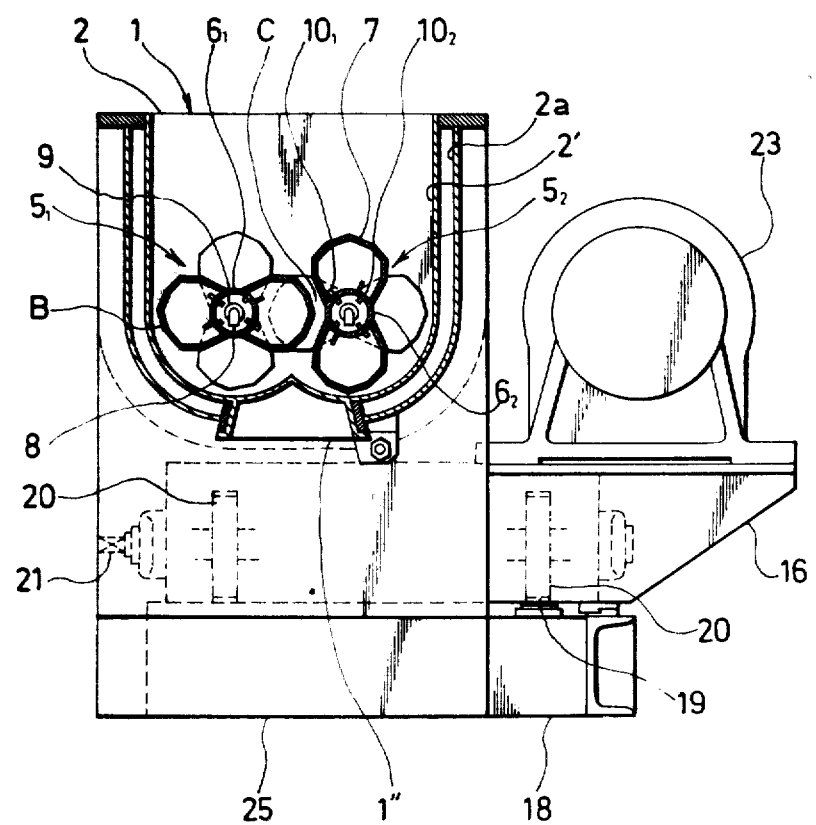
FIG. 3 is a side view of the vessel in section.
Figure 4:
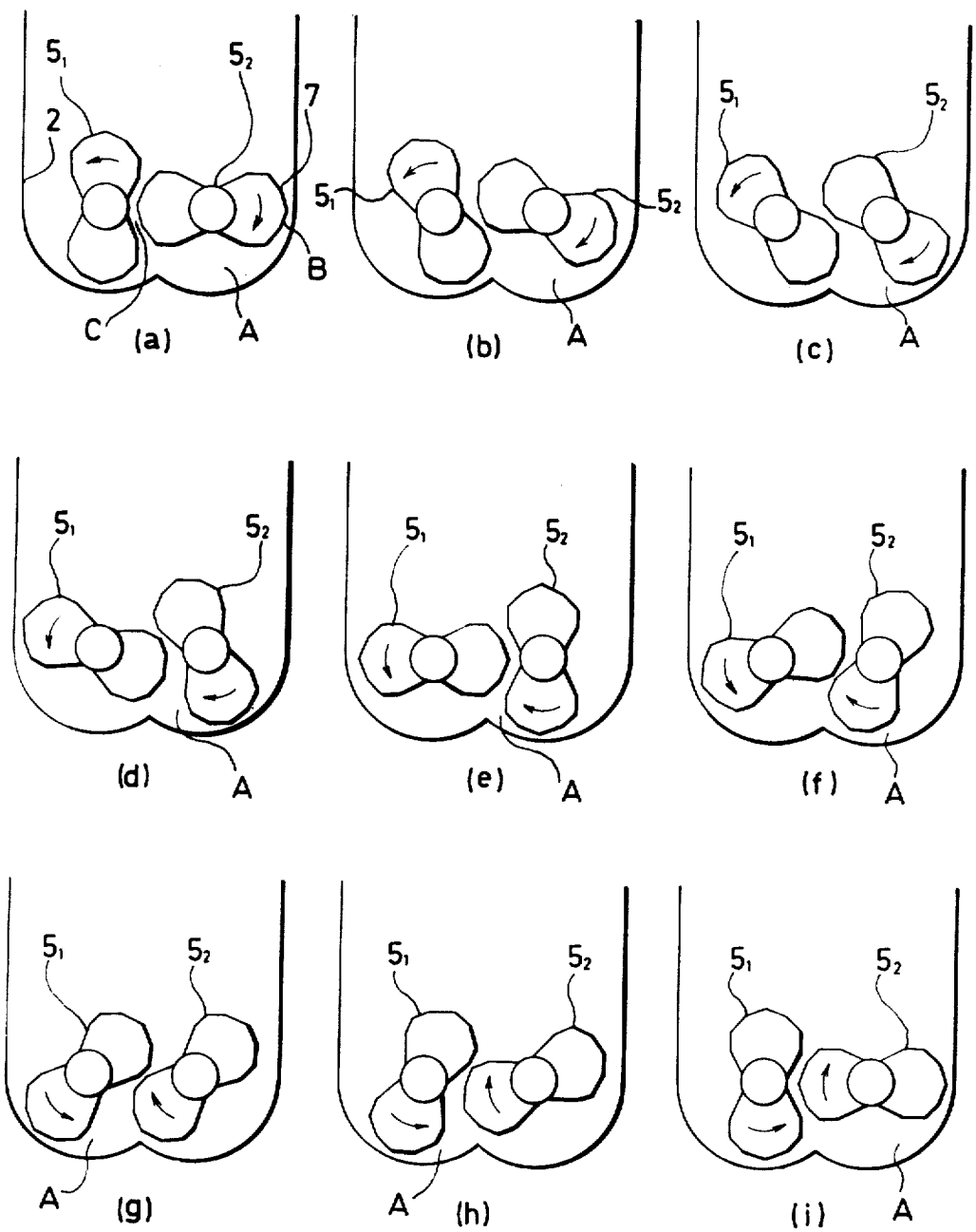

Referring now to FIGS. 1 through 3, there is shown a vessel 1 as comprising a jacketed kettle body 2 with a twin-rounded bottom connecting two arcs generally in an ω-pattern, and two jacketed side plates 3, 4 closing both open sides, or axially front and rear ends, of the kettle body 2. The vessel 1 includes a hopper opening 1' provided at its top for material feeding and a discharge opening 1" formed at its bottom. The kettle body 2 has a wall 2a of double construction so that steam or other heating medium can be filled in the hollow of double-wall structure and the inner wall surface can serve as a heating surface 2'. The jacketed side plates 3, 4 are both detachably fitted to the kettle body 2. Of the two, the side plate 3 is movable integrally with a movable bearing stand to be described later. A pair of rotor means $5_1$, $5_2$ are rotatably held inside the kettle body so as to be driven in opposite directions along the bottom of the vessel. Each of the rotor means $5_1$, $5_2$ comprises a rotating shaft $6_1$ or $6_2$ and a desired number of hollow rotors 7 (the embodiment being shown with two such rotors) mounted on the shaft. Each rotor 7 is made polygonal in cross section, generally to a two-lobe or figure eight contour. Into these rotors 7 can be introduced a heating medium, for example, steam, through hollows of the rotating shafts $6_1$, $6_2$. The rotors 7 on each rotating shaft are staggered at 90° to one another. They are also spaced at 90° to the opposing rotors of the other shaft. As already indicated, the rotating shafts $6_1$, $6_2$ are made hollow, and along the center axis of each shaft is inserted a fixed shaft 9 with a built-in siphon 8.

The rotating shafts $6_1$, $6_2$ have inlet tubes $10_1$ and outlet tubes $10_2$ for communication between the hollow of each shaft and the inside spaces of the rotors 7 carried by that shaft. Numerals 11 and 12 indicate, respectively, the inlet and outlet of lines for heating medium supply connected to the rotating shafts by rotary joints 13.

Inside the vessel 1 the rotating shafts $6_1$, $6_2$ are detachably supported at the ends by bearings 14, and their intermediate portions are held by the side plate 3 with the aid of seals 15 and also borne by a movable bearing stand 16 with bearings 17. Thus, as the movable bearing stand 16 travels on a bed 18, the rotating shafts $6_1$, $6_2$ are accordingly carried forward or backward. The movable bearing stand 16 has a pinion 20 in mesh with a rack 19 laid on the bed 18, and the rotating shafts $6_1$, $6_2$ can be axially moved by rotating a shaft 21 which carries the pinion 20. A sprocket wheel 22 is linked to a sprocket wheel 23a of a motor 23 equipped with a reduction gear for the transmission of driving power. Also, gears 24 for power transmission are mounted on the rotating shafts and meshed to each other. The vessel 1 is placed on its own base 25.

The operation of the present apparatus, as used in melting a solid material meltable to a highly viscous state, will now be described.

First, the material to be melted, for example, a wax, rosin, or a synthetic resin alone or a mixture of such substances which will yield a highly viscous melt, is placed in the vessel 1 defined by the kettle body 2 and both side plates 3, 4. At this time, several different substances of varied physical properties, in amounts measured beforehand depending upon the intended use of the material, are added in succession until a predetermined compounding ratio is attained. The material thus fed to the vessel is heated as it is forced against the jacketed heating surface 2' of the kettle body 2 by the revolution of the rotor means $5_1$, $5_2$ that serve themselves as heating surfaces. The volume A of the space surrounded by the rotor means $5_1$, $5_2$ and the kettle body 2 decreases as the rotor means revolve, and the portion of material trapped in that space is brought into contact with the heating surface 2' while being intensely compressed by the rotor means. At the same time, the mass in that space is heated and melted under subjection to rigorous deforming actions. This process is schematically illustrated in FIGS. 4(a) through (i).

The polygonal cross section of the rotors 7 provides sufficient friction to keep much of the still solid material in contact with the running rotors and also prevent the compressed material from escaping through the clearance B between the rotor means $5_1$, $5_2$ and the kettle body 2 and through the clearance C between the rotor means themselves. So far as melt mixing is concerned, as many rows of the rotor means $5_1$, $5_2$ as feasible (although the embodiment of the invention is shown with two rows) will give good result. In any case, the rotors 7 in adjacent rows on the rotating shafts $6_1$, $6_2$ are staggered or spaced at 90° to each other, and therefore they interrupt the sidewise escape of the mass under compression by the rotors.

As the heating medium, usually steam or hot oil, or sometimes an electric heater or the like, is used. The operation of the apparatus using steam for this purpose will now be explained in connection with the drawings. In the embodiment shown, saturated steam is admitted through the conventional rotary joints 13 attached to the ends of the rotating shafts $6_1$, $6_2$ into the spaces between the hollows of the shafts and the siphons, and thence into the rotors 5 by way of the heating-medium inlet tubes $10_1$. Inside the rotors the steam is condensed by heat exchange, and the resulting drain enters the siphons 8 through the outlet tubes $10_2$ and is discharged from the outlets 12 again via the rotary joints 13, but this time through their central holes.

The rotary joints 13 are connected to a heating medium source by flexible hoses (not shown).

After the charge has been melted and mixed as desired, the discharge opening 1″ at the bottom of the kettle body 2 is opened. The melt is then readily urged out of the vessel 1 by the compressive forces being imposed by the rotor means $5_1$, $5_2$. Some molten material remains, clinging to the surfaces of the rotors 7 as well as to the inner wall surface of the vessel 1. However, the composition of the residual material is homogeneous as originally compounded and is the same as that of the next batch, and mixing it with the freshly charged material presents practically no problem whatever, unless the latter is of a different kind or color.

For a change of the material to a new one of a different kind or color, a handle (not shown) fixed on the outer end of the pinion shaft 21 is turned and the bearing stand 16 is caused to slide over the bed 18. Consequently, thr rotor means $5_1$, $5_2$ are easily taken out, together with the rotating shafts $6_1$, $6_2$ from the kettle body 2 (FIG. 5). The rotor means are thus cleaned quite easily and perfectly. In this state, there is nothing obstructive for cleaning left inside, and the kettle body 2 also can be cleaned with utmost ease. If necessary, the side plate 4 may be detached to permit more thorough cleaning.

As has been stated above, the melt mixer according to this invention uses rotor means which themselves function as heating surfaces, and heats the material while compressing and deforming the same between those surfaces and the heating surface of the kettle body. Therefore, it can effectively heat the material to a molten state. Moreover, because the compressively deforming and releasing actions are sustained by the plural rows of rotor means angularly staggered, the melted and unmelted portions of the material are adequately disturbed and pushed into each other for thorough mixing. In this way, the mass can be melted and mixed as desired by operation within a very short period of time.

In addition, when switching to the melting and mixing of a material of a different kind or color as is often required in the operation of this character, a number of practical advantages not offered by the existing equipment are derived from the present apparatus. Since the rotor assembly and the kettle assembly can be separated at a negligible cost of time and labor, the adhering residue of material can be removed from those surfaces and the essential parts can be cleaned with extreme ease. Also, the rotors with simplified configurations lend themselves to the cleaning.

What is claimed is:

1. A melt mixer comprising a vessel having means for heating the contents thereof, at least one pair of rotors, each of said rotors having a central shaft and at least one pair of diametrically opposed lobes of polygonal cross-section, said rotors being arranged within said vessel such that the respective lobes thereof are rotatable in overlapping circles of rotation lying in a common vertical plane, the lobes of one of said rotors in each said pair being angularly offset from the lobes of the other rotor in said pair and spaced from the adjacent wall of the vessel so that the area bounded by said lobes and the adjacent vessel wall decreases cyclically during rotation of said rotors and the contents of the vessel within said area are subjected to compressive forces and are urged into engagement with the said adjacent with the said adjacent wall of the vessel.

2. The melt mixer according to claim 1, wherein said vessel comprises vertical side walls and a bottom wall, said bottom wall being arcuate to conform to at least a portion of the circles of rotation of said rotors and said rotors extend at least in part within said arcuate portions of said bottom wall.

3. The melt mixer according to claim 2, wherein the bottom wall of said vessel is w-shaped.

4. The melt mixer according to claim 2, wherein said vessel consists of a jacketed double wall and is provided with means for passing a heating medium therethrough.

5. The melt mixer according to claim 2, wherein said central shafts of said rotor are journalled within a side wall of said vessel, said side wall being removable from said vessel.

6. The melt mixer according to claim 5, wherein said removable wall and said rotor shafts are mounted on a movable support having means for selectively separating said vessel therefrom.

7. The melt mixer according to claim 1, wherein the lobes of one rotor are angularly offset from the lobes of the other rotor by 90°.

8. The melt mixer according to claim 1, wherein each of the rotors includes a plurality of pairs of diametrically opposed lobes axially spaced along the central shaft thereof, the lobes in each successive pair being angularly offset from the lobes in the adjacent pair and, the pairs of lobes of one rotor lying in common planes with those of the other rotor.

9. The melt mixer according to claim 1, including means for heating the interior of said lobes.

10. The melt mixer according to claim 1, including a source of heat, conduit means extending through said central shafts from said source to said lobes.

11. The melt mixer according to claim 10, wherein said shafts and lobes are hollow and constitute said conduit means.

12. A melt mixer comprising a vessel having vertical side walls and a bottom wall, one of said side walls being arcuate to conform to at least a portion of the circles of rotation of at least one pair of rotors mounted in said vessel, at least one pair of rotors each having a central shaft journalled in said removable side wall and at least one pair of diametrically opposed lobes of polygonal cross-section, said rotors being arranged within said vessel such that the respective lobes thereof are rotatable in overlapping circles of rotation lying in a common vertical plane and said rotors extend at least in part within said arcuate portion of said bottom wall, the lobes of one of said rotors in each said pair being angularly offset from the lobes of the other rotor in said pair and spaced from the adjacent wall of the vessel so that the area bounded by said lobes and the adjacent vessel wall decreases cyclically during rotation of said rotors and the contents of the vessel within said area are subjected to compressive forces and are urged into engagement with the said adjacent wall of the vessel, movable support means being provided for said removable side wall and the rotors journalled therein for selectively separating said removable side wall and said rotors from said vessel.

13. The melt mixer according to claim 12, wherein said bottom wall of the vessel is W-shaped.

14. The melt mixer according to claim 12, wherein said bottom and side walls of the vessel comprise a jacketed double wall and means are provided for passing a heating medium therethrough.

15. The melt mixer according to claim 12, wherein the lobes of one rotor are angularly offset from the lobes of the other rotor by 90°.

16. The melt mixer according to claim 12, wherein each of said rotors includes a plurality of pairs of diametrically opposed lobes axially spaced along the central shaft thereof, the lobes in each successive pair being angularly offset from the lobes in the adjacent pair, and the pairs of lobes of one rotor lie in common planes with those of the other rotor.

17. The melt mixer according to claim 12, including means for heating the interior of said lobes.

18. The melt mixer according to claim 12, including a source of heat, conduit means extending through said central shafts from said source to said lobes.

19. The melt mixer according to claim 18, wherein said shafts and lobes are hollow and constitute said conduit means.

20. The melt mixer according to claim 12, wherein said movable support means is movably mounted on a bed, cooperable rack and pinion means being provided on said bed and movable support means for permitting relative movement therebetween.

* * * * *